: (12) United States Patent
Almeida et al.

(10) Patent No.: US 7,117,334 B2
(45) Date of Patent: Oct. 3, 2006

(54) DYNAMIC NODE PARTITIONING UTILIZING SLEEP STATE

(75) Inventors: Jason Robert Almeida, Raleigh, NC (US); Scott Neil Dunham, Raleigh, NC (US); Eric Richard Kern, Durham, NC (US); William Bradley Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/845,873

(22) Filed: May 14, 2004

(65) Prior Publication Data

US 2005/0283523 A1    Dec. 22, 2005

(51) Int. Cl.
*G06F 12/00* (2006.01)
(52) U.S. Cl. .................... 711/173; 711/162; 711/163
(58) Field of Classification Search .................. None
See application file for complete search history.

(56) References Cited

U.S. PATENT DOCUMENTS

| 5,325,526 | A | 6/1994 | Cameron et al. |
| 5,625,811 | A | 4/1997 | Bhide et al. |
| 6,134,167 | A * | 10/2000 | Atkinson ................ 365/222 |
| 6,345,267 | B1 | 2/2002 | Lohman et al. |
| 6,363,495 | B1 | 3/2002 | MacKenzie et al. |
| 6,578,071 | B1 | 6/2003 | Hagersten et al. |
| 6,754,792 | B1 * | 6/2004 | Nakamura et al. ......... 711/162 |
| 7,055,059 | B1 * | 5/2006 | Yanai et al. ................ 714/7 |
| 2003/0046531 | A1 * | 3/2003 | Hiramoto ................ 713/100 |
| 2003/0131067 | A1 | 7/2003 | Downer et al. |

* cited by examiner

*Primary Examiner*—Mano Padmanabhan
*Assistant Examiner*—Michael B. McFadden
(74) *Attorney, Agent, or Firm*—Martin J. McKinley; Dillon & Yudell LLP (57) ABSTRACT

A method and system for allowing nodes in a multi-node computer to be appropriated by a master node in the multi-node computer. The node to be appropriated is suspended into an ACPI S3 Sleep State, causing current system operations state information to be stored in a backup memory in the appropriated node. The master node then populated a primary memory in the appropriated node with OS and other information required to join a partition that includes the master node. When the master node no longer wishes to use the appropriated node, the backup memory in the appropriated node is mirrored back into the primary memory. When the appropriated node "wakes up" from the S3 state, it continues executing software commands where it left off, without knowing anything that had happened after going into the S3 state.

15 Claims, 9 Drawing Sheets

DYNAMIC NODE PARTITIONING UTILIZING SLEEP STATE

BACKGROUND OF THE INVENTION

1. Technical Field

The present invention relates in general to the field of computers, and in particular to multi-node computers. Still more particularly, the present invention relates to a method and system for allowing a master node in a multi-node computer to appropriate the resources of another node in the multi-node computer while the other node is in an ACPI S3 Sleep State.

2. Description of the Related Art

In multi-node computers, such as the x-Series® of servers manufactured by International Business Machines Corporation, it is possible to configure two or more physical nodes into a larger logical partition where a single operating system can utilize the resources across all nodes. In this scenario, each individual machine boots up to a common point in Power On Self Test (POST) firmware, and then determines if it should merge with one or more other nodes(s). If one or more systems were to merge, it is typically not possible for the partition to be separated into individual nodes without a complete system reset to POST. Likewise, if each node was to boot as a stand-alone system into an operating system, it is not possible for those systems to logically "join" a partition without rebooting both nodes.

Therefore, there is a need for a method and system that allows a first node in a multi-node computer to be able to hot join a second node in a logical partition, regardless of the operating system in use by the second node, without having to reboot the entire partition.

SUMMARY OF THE INVENTION

The present invention is directed to a method and system for allowing nodes in a multi-node computer to be appropriated by a master node in the multi-node computer. The node to be appropriated is suspended into an ACPI S3 Sleep State, causing current system operations state information to be stored in a backup memory in the appropriated node. The master node then populates a primary memory in the appropriated node with operating system and other information required to join a logical partition that includes the master node. When the master node no longer wishes to use the appropriated node, the backup memory in the appropriated node is mirrored back into the appropriated node's primary memory. When the appropriated node "wakes up" from the S3 state, it continues executing software commands where it left off when the S3 sleep state was initiated.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3a depicts additional detail of the multi-node computer in the state shown in FIG. 1a;

DETAILED DESCRIPTION OF A PREFERRED EMBODIMENT

Figure 1A:
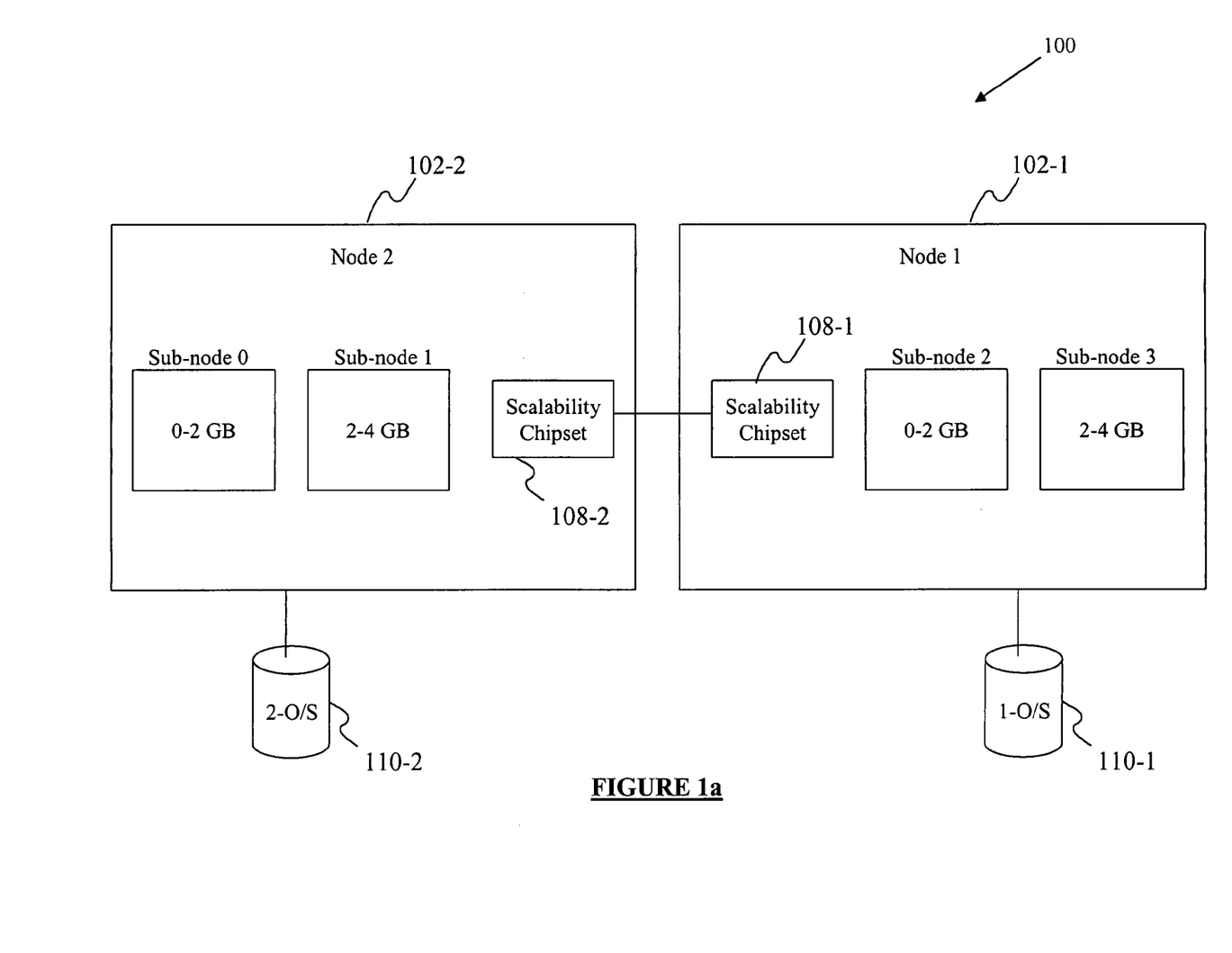
FIG. 1a depicts an exemplary multi-node computer used in the present invention having a first and second node.

With reference now to the figures, and in particular to FIG. 1a, there is depicted a block diagram of a multi-node computer 100 as used by the present invention. Multi-node computer 100 includes a first node 102-1 (Node 1) and a second node 102-2 (Node 2). Stored in Sub-node 2 is data used by first node 102-1 at addresses for the first two gigabytes of memory (0–2 GB), while Sub-node 3 stores data at addresses for the next two gigabytes of memory (2–4 GB).

Similarly, second node 102-2 has a Sub-node 0 and a Sub-node 1. Stored in Sub-node 0 is data used by second node 102-2 at addresses for the first two gigabytes of memory (0–2 GB), while Sub-node 1 stores data at addresses for the next two gigabytes of memory (2–4 GB).

Coupling first node 102-1 to second node 102-2 is a pair of scalability chipsets 108, with scalability chipset 108-1 being associated with first node 102-1, and scalability chipset 108-2 being associated with second node 102-2. While depicted as separate scalability chipsets, scalability chipset 108-1 and 108-2 can be functionally considered as one scalability chipset. Scalability chipsets 108 allow nodes to join up in partitions through the use of sending and receiving buffers (not shown) within the scalability chipsets 108. These buffers allow nodes to communicate information required to form a partition, including memory maps, control System Management Interrupts (SMIs) from a "master" node (such as second node 102-2 in the present invention), a single Operating System (O/S) to be used by all nodes, etc.

Each node 102 has a non-volatile memory (NVM) 110 dedicated to the node. Each NVM 110 is preferably a hard drive system configured as a Direct Access Storage Device (DASD). For example, first node 102-1 has non-volatile memory 110-1, which stores the operating system (1-O/S) that first node 102-1 is using, assuming that first node 102-1 booted up as an independent node. Similarly, second node 102-2 has non-volatile memory 110-2, which stores the operating system (2-O/S) that second node 102-2 is using, again assuming that second node 102-2 booted up as an independent node. Of course, by coincidence or design 2-O/S and 1-O/S may be a same type of O/S.

Alternatively, first node 102-1 and second node 102-2 can operate under a single O/S from a single node 102. For example, in the present invention, second node 102-2, acting as a master node, can issue an SMI that directs first node 102-1 to disconnect from the 1-O/S in non-volatile memory 110-1, and instead run on the 2-O/S stored in non-volatile memory 110-2. By operating under a same O/S, first node 102-1 and second node 102-2 can operate within a same logical partition.

Figure 1B:
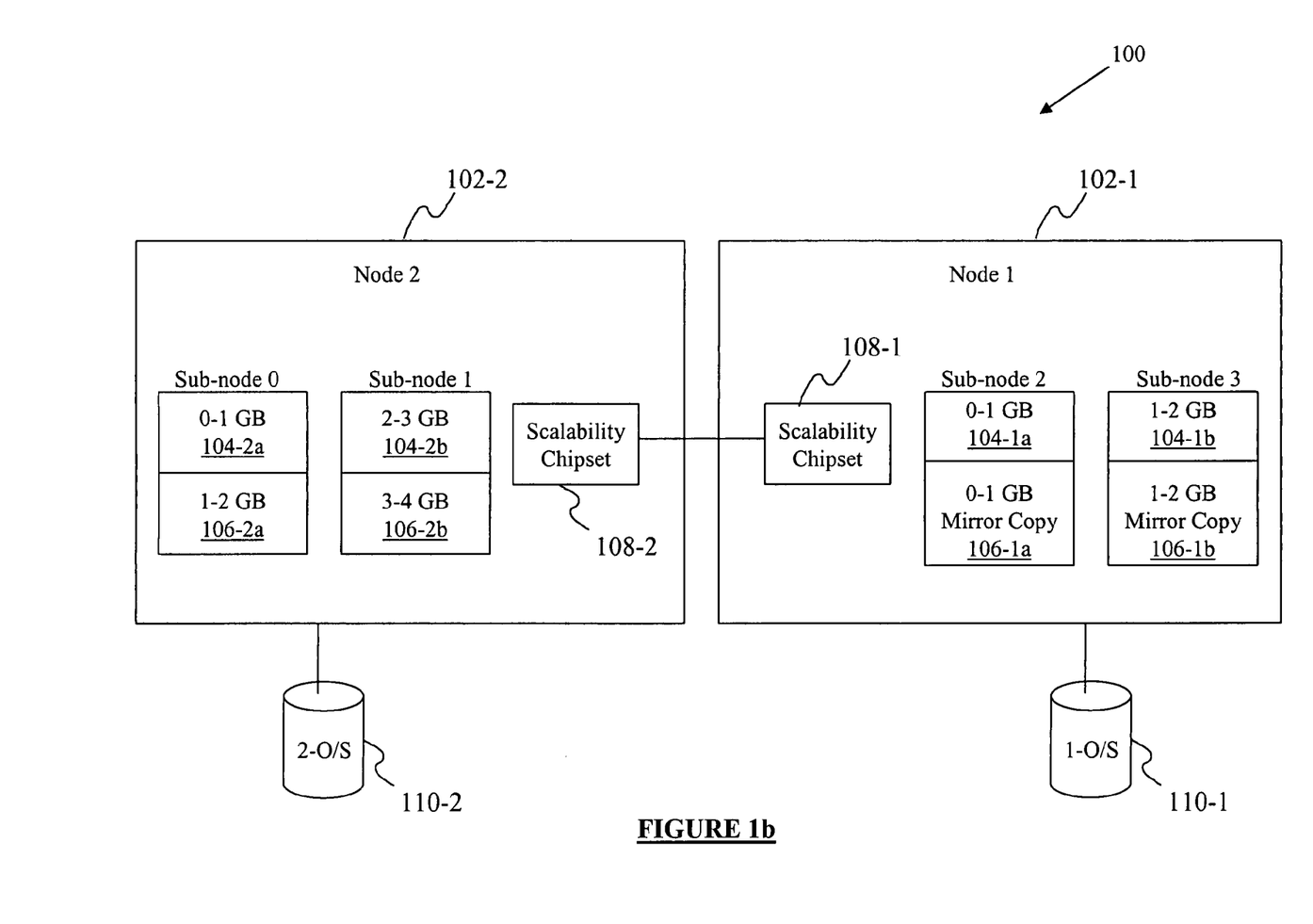
FIG. 1b illustrates the multi-node computer of FIG. 1a with the first node having a mirror copy of currently system operating state information in a backup memory.

With reference now to FIG. 1b, within each node is a primary memory 104 and a second memory 106. Primary memory 104 and secondary memory 106 can store contiguous memory addresses, or alternatively, secondary memory 106 can be used as a backup (mirror) memory of primary memory 104. Thus, as depicted in FIG. 1b, secondary memories 106-1a and b are used as a backup to primary memories 104-1a and b by storing a mirror copy of the first two gigabytes of memory (0–2 GB) used by first node 102-1. The next two gigabytes of memory (2–4 GB) are thus not stored in system memory (but can obviously be stored statically in non-volatile memory 110-1). As depicted in FIG. 1b, meanwhile, second node 102-2 uses primary memories 104-2a and b and second memories 106-2a and b to store contiguous memory locations 0–4 GB.

The present invention capitalizes on 1) the capability of first node 102-1 to use memory mirroring of primary memory 104-1 using secondary memory 106-1, and 2) the features of the Advanced Configuration and Power Interface (ACPI) S3 sleep state (discussed in detail below). These two features result in second node 102-2 being able to use a master SMI command to first node 102-1 that puts first node 102-1 into the ACPI S3 sleep state, and while first node 102-1 is in this sleep state, second node 102-2 is able to appropriate the resources of first node 102-1, including primary memory 104-1. When first node 102-1 "wakes up" from the S3 state, it will have no memory of being used by second node 102-2 while first node 102-1 was asleep.

Figure 1C:
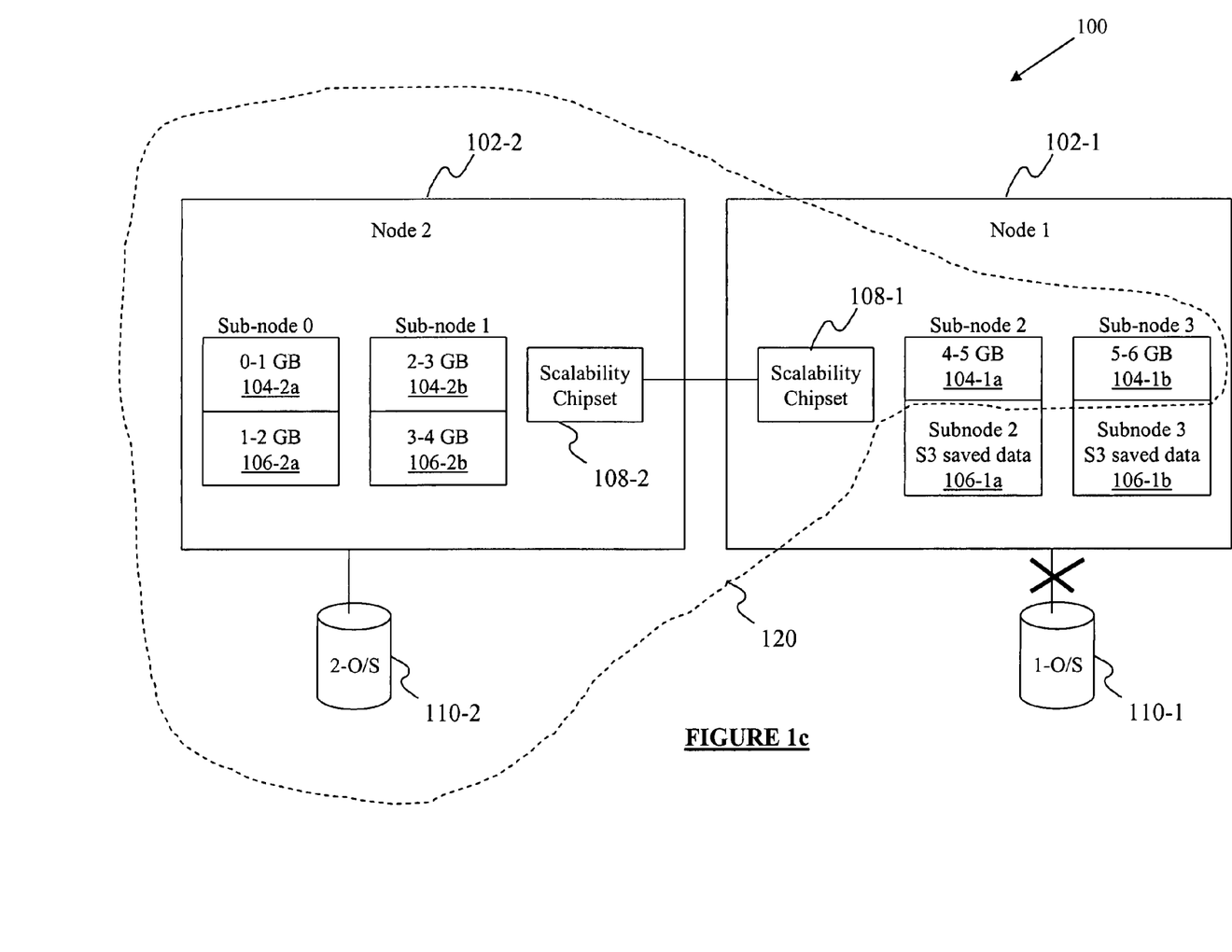
FIG. 1c depicts the multi-node computer with the first node being appropriated for use in a partition with the second node.

FIG. 1c illustrates multi-node computer 100 after second node 102-2 has appropriated the resources of first node 102-1 while first node 102-1 is in an S3 sleep state. Second node 102-2 has incorporated first node 102-1, including primary memories 104-1a and b, into a partition 120. The addition of primary memory 104-1 allows another 2 gigabytes of system memory (addressed at 4–6 GB) stored in primary memory 104-1 to be used by partition 120. Note also that second node 102-2 and partition 120 may be able to use processing logic within first node 102-1 while first node 102-1 is appropriated into partition 120.

Note that while in the S3 sleep state, first node 102-1 is unable to access the 1-O/S stored in non-volatile memory 110-1, so that the entire partition 120 is able to operate without conflicts using the 2-O/S stored in non-volatile memory 110-2.

The present invention utilizes features defined by the Advanced Configuration and Power Interface (ACPI) protocol. The details of the ACPI protocol are described in "Advanced Configuration and Power Interface Specification, Revision 2.0c," published Aug. 25, 2003 by Compaq Computer Corporation, Intel Corporation, Microsoft Corporation, Phoenix Technologies Ltd., and Toshiba Corporation, which is herein incorporated by reference in its entirety, either as the version cited or any other subsequent version. ACPI provides a standards-based platform that enables network managers to remotely administer and manage client computers.

The ACPI protocol defines different power states in a computer. The global system state definitions are G3 through G0.

G3 is "Mechanical Off." This state is entered and left by a mechanical means, such as turning off the computer's power switch. When coming out of the G3 state, the computer must be re-booted.

G2 is "Soft Off." In this state, the computer consumes a minimal amount of power. No code is run, and a large latency is required to return the computer to a working (G0) state since the computer's context is not preserved in hardware, and must be restarted to return to the G0 state.

G1 is "Sleeping." In this state, the computer uses a small amount of power, user mode threads are not executed, but most of the context states are preserved, thus making a re-start faster. G1 has sublevels S1 through S4, which further define how "deep" the sleeping state is.

Sublevel S1 of G1 is a low wake latency sleeping state. In this state, all system operation state information in system memory is retained, and thus no system context is lost.

Sublevel S2 of G1 is a low wake latency sleeping state. This state is similar to Sublevel S1, except the CPU and system cache information is lost.

Sublevel S3 of G1 is a low wake latency sleeping state in which all system operation state information is lost except for system memory. Thus, CPU, cache and chip set context are lost.

Sublevel S4 of G1 is the lowest power, longest wake latency sleeping state supported by ACPI. Only platform context is maintained, as it is assumed that the hardware platform has powered off all peripheral devices.

Sublevel S5 of G1 is a Soft Off State that is similar to Sublevel S4, except that the O/S does not save any context. The system is in the "soft" off state and requires a complete boot when it wakes up.

Global System definition G0 is "Working." In this state, the computer itself is at full operation capacity, although peripheral devices may be in reduced power states.

Figure 2:
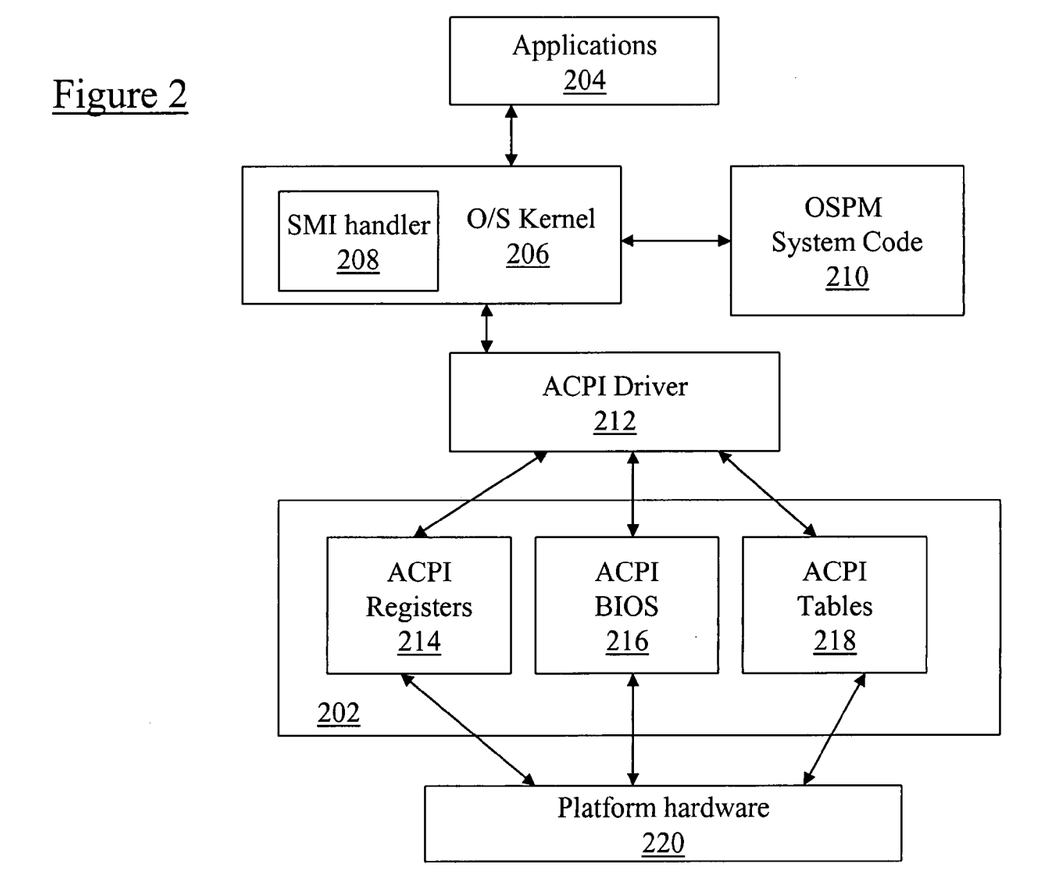
FIG. 2 illustrates the software organization of the Advanced Configuration and Power Interface (ACPI) protocol.

With reference now to FIG. 2, there is depicted a diagram of the hardware/software structure of ACPI software 202. ACPI software 202 interfaces between software, such as applications 204, operating system (OS) kernel 206, which includes System Management Interrupt (SMI) code 208, Operating System-directed Power Management (OSPM) 210, and ACPI driver 212; and platform hardware 220, such as but not limited to CPU 318 described in FIGS. 3a–c.

ACPI 202 includes three run-time components: ACPI System Description Tables 218, ACPI Registers 214, and ACPI System Firmware (BIOS) 216. ACPI System Description Tables 218 described the interfaces to platform hardware 220. ACPI Registers 214 include the constrained part of the hardware interface, described by the ACPI System Description Tables 618.

Figure 3A:
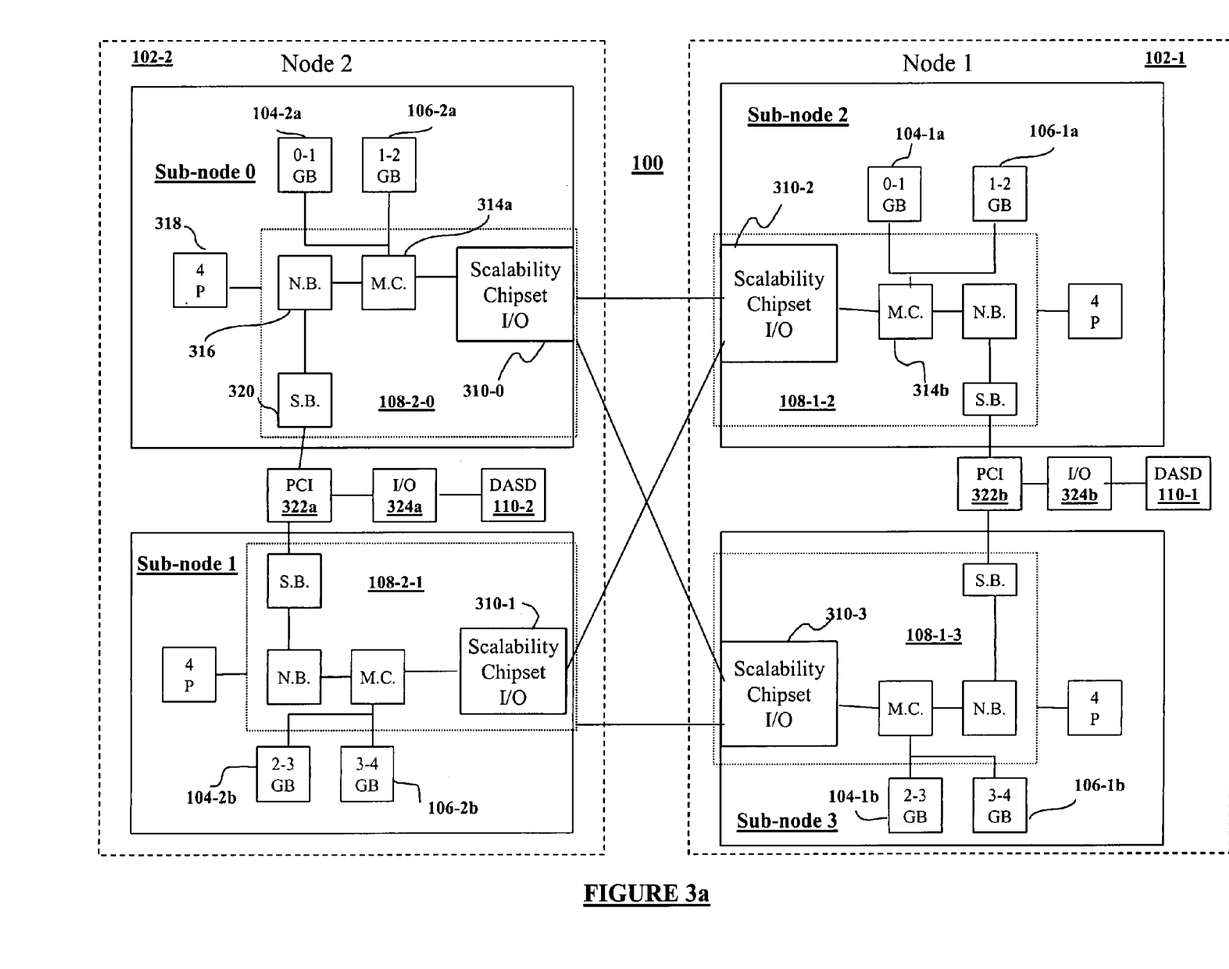

With reference now to FIG. 3a, additional details of multi-node computer 100, in the state described in FIG. 1a, are shown. As depicted in FIG. 3a, multi-node computer system 100 has at least two nodes 102, each of which has at least one sub-node. Each node 102 functions as a discrete processing unit, having a shared Peripheral Component Interconnect (PCI) 322 connected to the Southbridge 320 of each sub-node in nodes 102. Each node 102 includes a scalability chipset 108, which includes a Northbridge 316 connected to the node's Southbridge 320. Scalability chipsets 108 are composed of multiple sub-chipsets. For example, scalability chipset 108-1, depicted in FIG. 1a, includes scalability chipset 108-1-2 in Sub-node 2 and scalability chipset 108-1-3 in Sub-node 3. Connected to each scalability chipset 108 is a processor 318, preferably multiple processors (depicted as four processors—"4P"). Each scalability chipset 108 also includes a scalability chipset I/O port 310.

Also within each scalability chipset 108 is a memory controller 314, which controls multiple volatile memories, such as primary memories 104 and backup/secondary memories 106. Primary memory 104 and secondary memory 106 are preferably each in a Single In-Line Memory Module (SIMM) or a Dual In-Line Memory Module (DIMM). Primary memory 104 (and if no mirroring, second memory 106), holds the system memory for processor 318 in the sub-node.

PCI 322 is a common interface for input/output (I/O) 324 for two sub-nodes that make up a single node 102. For example, PCI 322$b$ and I/O 324$b$ provide an input/output interface for both Sub-node 2 and Sub-node 3 as long as first node 102-1 is operating normally (has not been appropriated by second node 102-2). However, if first node 102-1 is appropriated into a partition by second node 102-2, then I/O 324$b$ blocks communication with non-volatile memory 110-1, thus isolating the partition from any O/S stored in non-volatile memory 110-1.

Figure 3B:
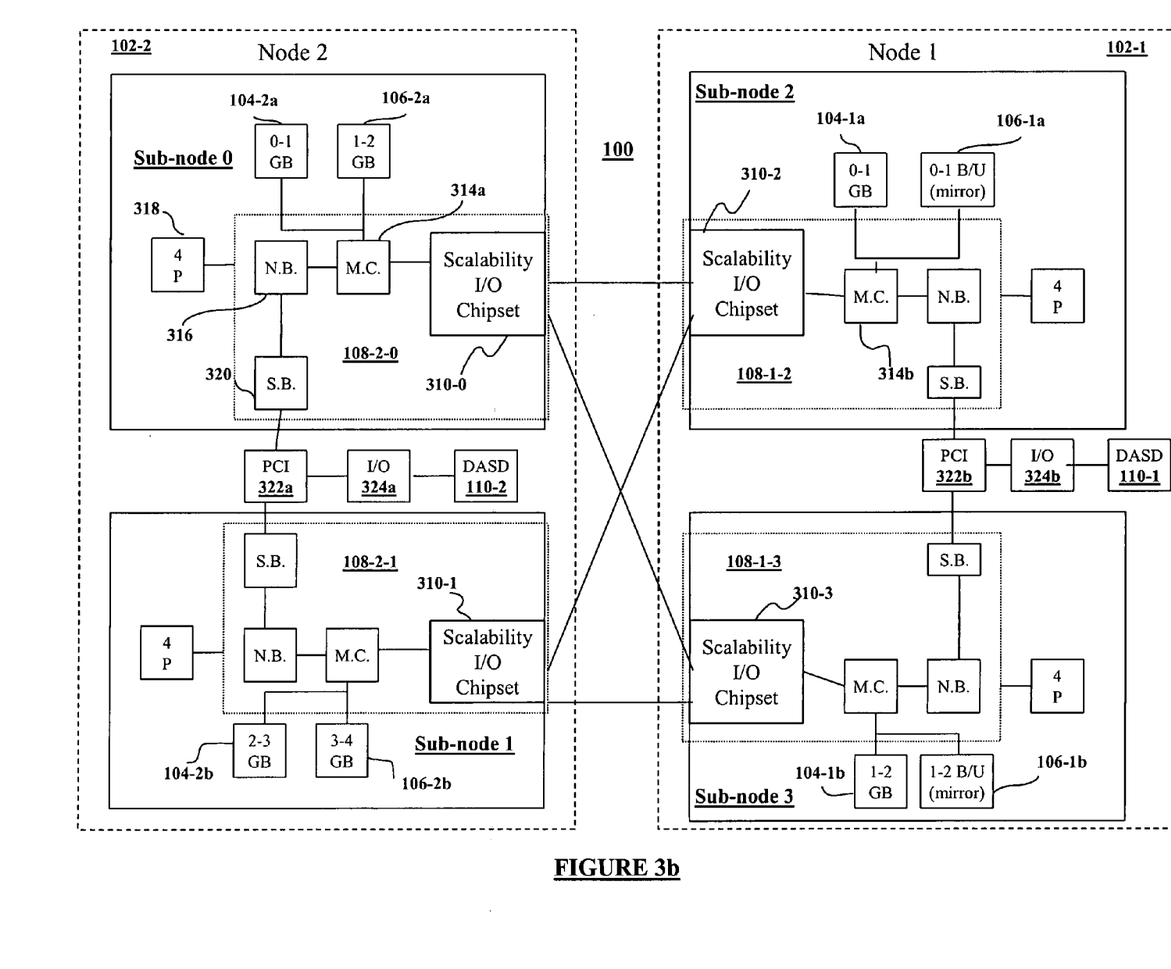
FIG. 3b illustrates additional detail of the multi-node computer in the state shown in FIG. 1b.

As shown in FIG. 3$a$, primary memory 104-1$a$ and secondary memory 106-1$a$ are used to store contiguous memory in address block 0–2 GB in Sub-node 2, as shown in FIG. 1$a$. Likewise, primary memory 104-1$b$ and secondary memory 106-1$b$ can be used to store contiguous memory in address block 2–4 GB in Sub-node 3. Alternatively, and as used in the present invention, backup secondary memory 106 can be used as a backup memory as described in detail below. Thus, in exemplary FIG. 3$b$, secondary memory 106-1$a$ and secondary memory 106-1$b$ backup (mirror) respective primary memories 104-1$a$ and 104-1$b$, resulting in the backup of primary memory 104-1 as illustrated in FIG. 1$b$. Note that in this mirroring mode, the data a memory address block 2–4 GB is not able to be stored, as was done in FIGS. 1$a$ and 3$a$.

Figure 3C:
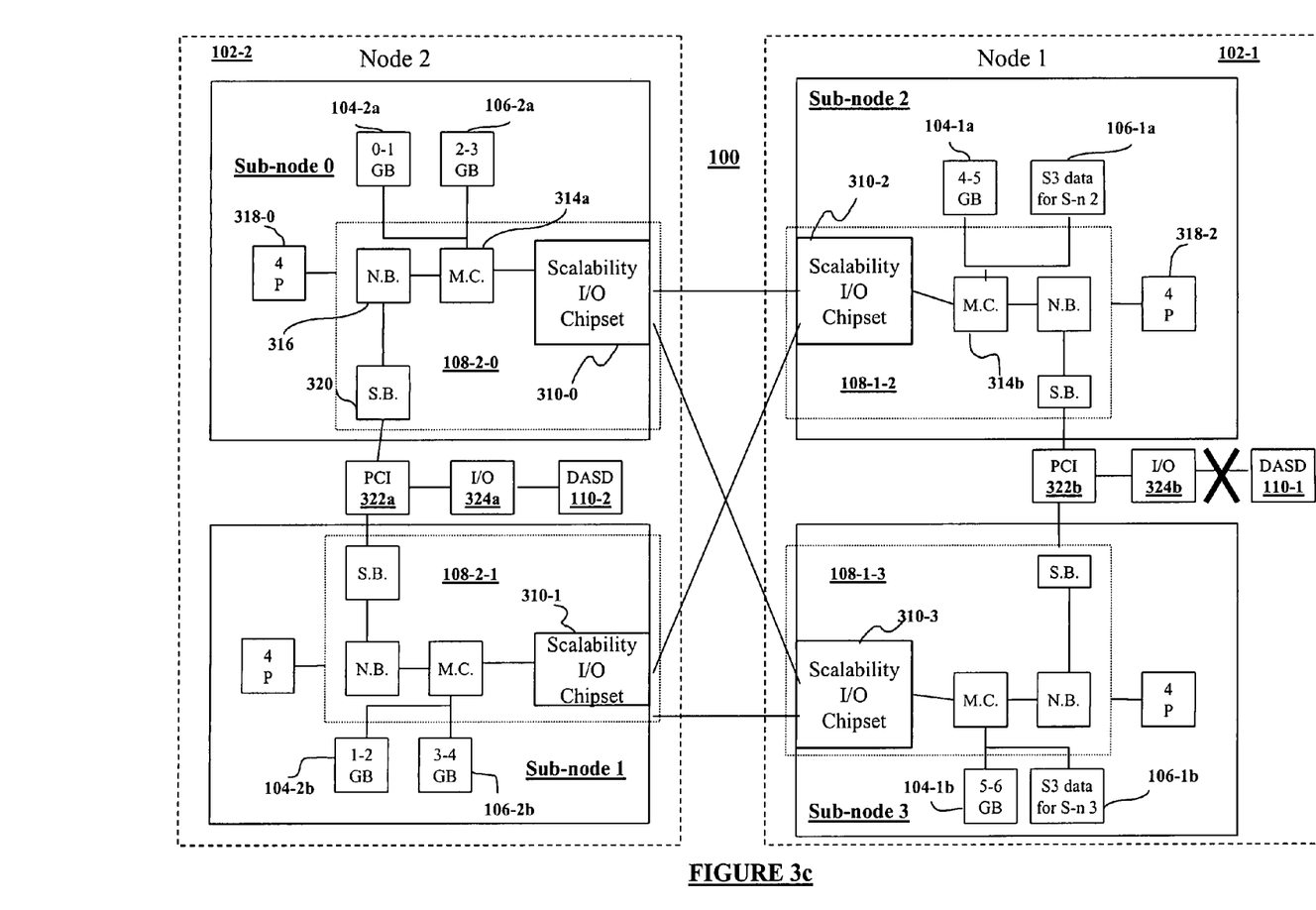
FIG. 3c depicts additional detail of the multi-node computer in the state shown in FIG. 1c.

With reference now to FIG. 3$c$, there is illustrated additional detail of multi-node computer 100 as depicted in the state shown in FIG. 1$c$. Primary memories 104-1$a$ and 104-1$b$ are appropriated to respectively store the data used by second node 102-2 at addresses 4–5 GB and 5–6 GB, resulting in second node 102-2 having use of an additional 2 gigabytes of memory. Secondary memories 106-1$a$ and 106-1$b$ are used to store up to 2 gigabytes of S3 data while first node 102-1 is in the S3 sleep state. Note also that access to non-volatile memory 110-1 has been blocked while first node 102-1 is in the S3 sleep state.

Figure 4A:
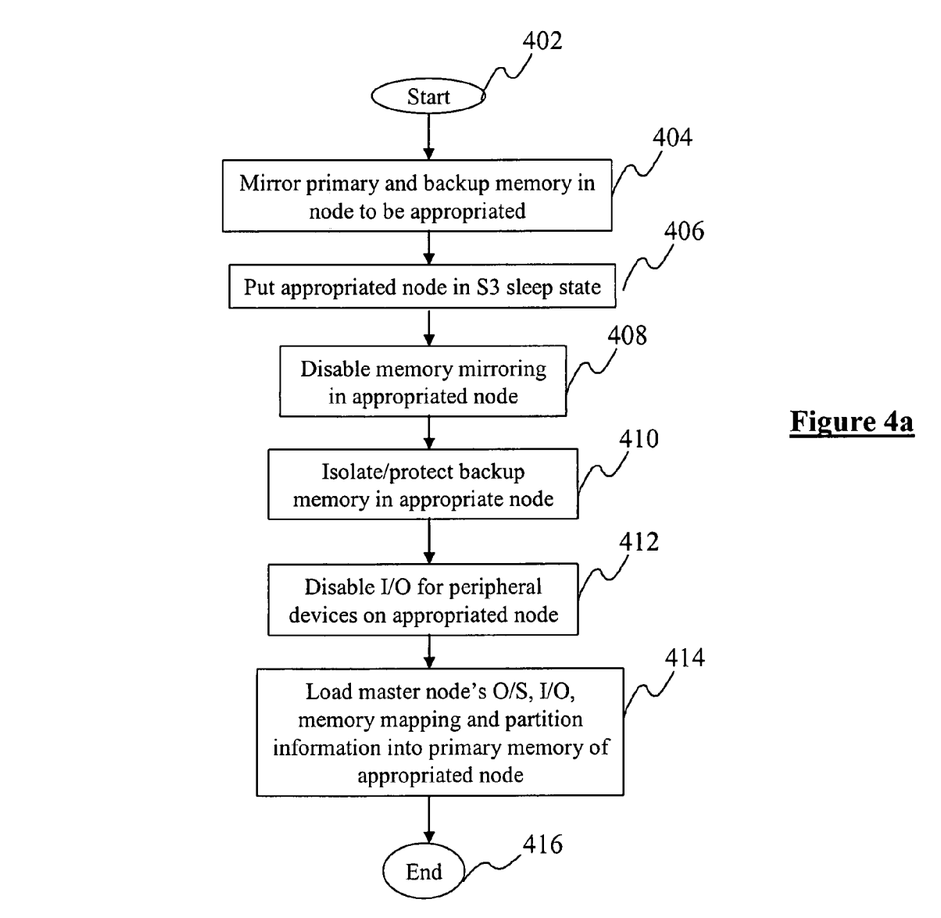
FIG. 4a is a flow chart describing steps taken to appropriate the first node into a partition that includes the second node by putting the first node into an S3 sleep state.

Referring now to FIG. 4$a$, there is illustrated a flow chart of steps taken to appropriate a node into a partition in accordance with a preferred embodiment of the present invention. After starting at initiator block 402, the first step (block 404) requires mirroring the memory in the node to be appropriated. This step is needed in the preferred embodiment of the invention in order to facilitate a fast wake-up of the node after it is de-appropriated out of the partition, and to make the primary memory in the appropriated node available for appropriation by the master node.

Next, the node to be appropriated (e.g., first node 102-1 illustrated in the figures above) is put into an ACPI sleep state (block 406), preferably the S3 sleep state. This step causes all current system operating state information to be stored in both the primary memory (e.g., primary memory 104-1) and the secondary memory (e.g., secondary memory 106-1).

Next, memory mirroring in the node to be appropriated is disabled (block 408), and the secondary memory is isolated (block 410) to prevent inadvertent over-writing of the ACPI S3 saved data in the second memory. To prevent the appropriated node from accessing an operating system that could conflict with an O/S used in a new partition, to which the appropriated node will be a part of, the input/output (I/O) for peripheral devices on the appropriate node is also disabled (block 412).

Next, a "master node," such as second node 102-2 appropriates the appropriated node (e.g., first node 102-1), as described in block 414. This appropriation is for the purpose of incorporating the appropriated node into a partition being formed by the second "master" node. The second node has a "super-SMI" authority, which enables it to take control of the first node, including the ability to load a new O/S into the first node's system memory, establish I/O information for peripheral devices associated with the new partition, and to map out the appropriated primary memory in the first node.

When the process of appropriating the first node is completed (block 416), the multi-node computer and partition are configured as shown in FIGS. 1$c$ and 3$c$. That is, the second node 102-2 has appropriated the primary memory 104-2 of first node 102-1 to store data at memory addresses represented in the $4^{th}$ to $6^{th}$ gigabytes of memory addresses accessible by the second node 102-2. The secondary memory 106-1 of first node 102-1 contains S3 data, allowing it to easily restart and pick up operations at the point at which it left off when it was put to sleep. The first node 102-1 is now operating the O/S chosen by the second node 102-2.

Figure 4B:
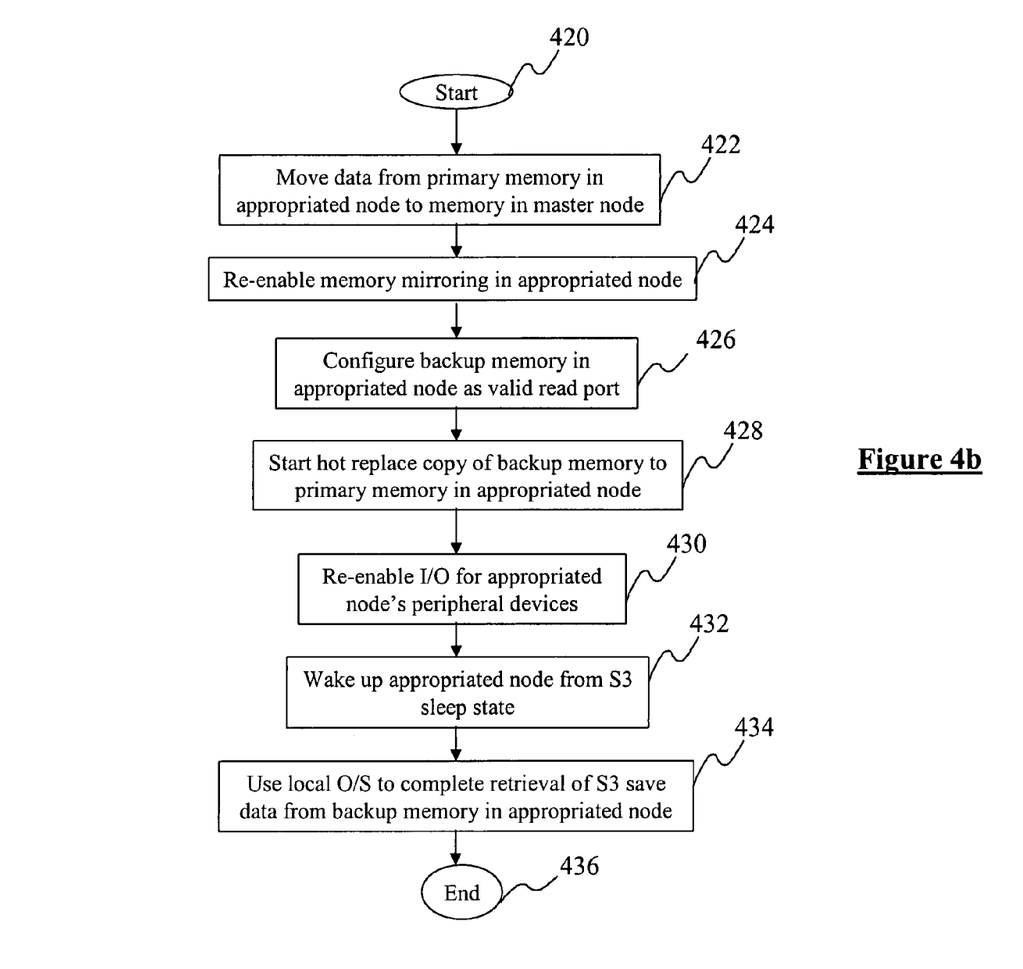
FIG. 4b is a flow chart describing steps taken to dynamically remove the first node from the partition.

With reference now to FIG. 4$b$, there is illustrated a flow chart of steps to be taken when taking the appropriated node out of the partition, and allowing the appropriated node to wake back up and continue executing operations that were interrupted by the sleep command. After starting at initiator block 420, data is moved from the primary memory in the appropriated node to the memory in the "master" second node (block 422). That is, while first node 102-1 (shown in FIGS. 1$a$–$c$ and 2$a$–$c$) was under the control of second node 102-2, data populated primary memory 104-1 that is only for partition 120. Thus, when decommissioning first node 102-1 out of partition 120, this data must be captured by second node 102-2, either in the primary memory 104-2, the secondary memory 106-2, or the non-volatile memory 110-2.

Next, memory mirroring in the appropriated node is re-enabled (block 424). The backup memory (e.g., secondary memory 106-1) is configured as a valid read port for the appropriated node (block 426), which allows the appropriated node to be hot started, replacing the contents of the backup memory into the primary memory of the appropriated node (block 428). The I/O for the appropriated node is re-enabled (block 430), allowing the appropriated node to access its own non-volatile memory 110-1.

Next, the appropriated node is awakened (block 432) from the S3 sleep state. Since access to the non-volatile memory 110-1 is now opened back up, and since memory mirroring is again enabled, the local O/S of the appropriated node can continue to repopulate the primary memory 104-1 of the appropriated node with O/S and system operation state information that was in place before the S3 sleep command was issued (block 434). When the process terminates at block 436, the system again looks like that shown above in FIGS. 1$b$ and 3$b$. Since pipelines, caches, and other state data registers are all restored as before the S3 sleep command, the appropriated node has no "recollection" of being used while in the S3 sleep state, and continues processing the next instruction as before the S3 sleep state.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media, or USB storage devices), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   enabling memory mirroring between a primary memory and a backup memory in a first node of a multi-node computer system;
   storing all current system operating state information for the first node in the primary and backup memories of the first node;
   subsequent to storing all current system operating state information, disabling memory mirroring and a peripheral device Input/Output (I/O) in the first node; and
   appropriating operation of the first node by a second node in the multi-node computer system, wherein the first and second node are partitioned into a same logical partition, such that the second node is able to utilize the primary memory and logical processing resources of the first node while the backup memory of the first node remains isolated to protect the previously stored system operating state information.

2. The method of claim 1, wherein the storing of all current system operating state information is in response to the first node being place in a sleep state.

3. The method of claim 2, wherein the sleep state is the S3 sleep state as defined by the Advanced Configuration and Power Interface (ACPI) standard.

4. The method of claim 2, further comprising:
   re-enabling memory mirroring and the peripheral device I/O in the first node;
   copying the stored system operating state information from the backup memory in the first node to the primary memory in the first node; and
   re-awakening the first node from the sleep state, wherein the first node continues to execute software instructions from a point at which software instructions were suspended when the first node went into the sleep state.

5. The method of claim 1, further comprising:
   removing the first node from the logical partition that contains the second node by moving any data from the primary memory in the first node to the second node.

6. A computer program product, residing on a computer readable storage medium, the computer program product comprising:

program code for enabling memory mirroring between a primary memory and a backup memory in a first node of a multi-node computer system;
   program code for storing all current system operating state information for the first node in the primary and backup memories of the first node;
   program code for, subsequent to storing all current system operating state information, disabling memory mirroring and a peripheral device Input/Output (I/O) in the first node; and
   program code for appropriating operation of the first node by a second node in the multi-node computer system, wherein the first and second node are partitioned into a same logical partition, such that the second node is able to utilize the primary memory and logical processing resources of the first node while the backup memory of the first node remains isolated to protect the previously stored system operating state information.

7. The computer program product of claim 6, wherein the storing of all current system operating state information is in response to the first node being place in a sleep state.

8. The computer program product of claim 7, wherein the sleep state is the S3 sleep state as defined by the Advanced Configuration and Power Interface (ACPI) standard.

9. The computer program product of claim 7, further comprising:
   program code for re-enabling memory mirroring and the peripheral device I/O in the first node;
   program code for copying the stored system operating state information from the backup memory in the first node to the primary memory in the first node; and
   program code for re-awakening the first node from the sleep state, wherein the first node continues to execute software instructions from a point at which software instructions were suspended when the first node went into the sleep state.

10. The computer program product of claim 6, further comprising:
    program code for removing the first node from the logical partition that contains the second node by moving any data from the primary memory in the first node to the second node.

11. A system comprising:
    a memory controller in a first node of a multi-node computer system, the memory controller:
      enabling memory mirroring between a primary memory and a backup memory in the first node;
      storing all current system operating state information for the first node in the primary and backup memories of the first node; and
      subsequent to storing all current system operating state information, disabling memory mirroring and a peripheral device Input/Output (I/O) in the first node; and
    a scalability chipset in the first node and a second node in the multi-node computer system for partitioning the first and second node into a same logical partition, such that the second node is able to utilize the primary memory and logical processing resources of the first node while the backup memory of the first node remains isolated to protect the previously stored system operating state information.

12. The system of claim 11, wherein the storing of all current system operating state information is in response to the first node being place in a sleep state.

13. The system of claim 12, wherein the sleep state is the S3 sleep state as defined by the Advanced Configuration and Power Interface (ACPI) standard.

14. The system of claim 12, wherein the memory controller in the first node further re-enables memory mirroring and the peripheral device I/O in the first node, and wherein the memory controller in the first node further copies the stored system operating state information from the backup memory in the first node to the primary memory in the first node, and wherein the scalability chipset further re-awakens the first node from the sleep state, such that the first node continues to execute software instructions from a point a which software instructions were suspended when the first node went into the sleep state.

15. The system of claim 11, wherein the scalability chipset further removes the first node from the logical partition that contains the second node by moving any data from the primary memory in the first node to the second node.

* * * * *